US007953669B2

(12) United States Patent
Ohbitsu

(10) Patent No.: US 7,953,669 B2
(45) Date of Patent: May 31, 2011

(54) INFORMATION PROCESSING APPARATUS

(75) Inventor: Toshiro Ohbitsu, Akishima (JP)

(73) Assignee: Fujitsu Limited, Kawasaki (JP)

( * ) Notice: Subject to any disclaimer, the term of this patent is extended or adjusted under 35 U.S.C. 154(b) by 1102 days.

(21) Appl. No.: 11/024,689

(22) Filed: Dec. 30, 2004

(65) Prior Publication Data
US 2005/0222916 A1 Oct. 6, 2005

(30) Foreign Application Priority Data
Mar. 30, 2004 (JP) ................................ 2004-099265

(51) Int. Cl.
*G06F 21/00* (2006.01)
(52) U.S. Cl. ........................................ 705/59; 705/52
(58) Field of Classification Search ................ 705/51, 705/52, 59
See application file for complete search history.

(56) References Cited

U.S. PATENT DOCUMENTS

| | | | | |
|---|---|---|---|---|
| 5,375,240 A * | 12/1994 | Grundy | ............................ | 726/28 |
| 5,625,690 A * | 4/1997 | Michel et al. | ................... | 705/53 |
| 5,694,546 A * | 12/1997 | Reisman | ......................... | 705/26 |
| 5,696,975 A | 12/1997 | Moore et al. | ................... | 395/712 |
| 5,732,266 A | 3/1998 | Moore et al. | ................... | 395/651 |
| 5,835,759 A | 11/1998 | Moore et al. | ................... | 395/651 |
| 5,991,402 A * | 11/1999 | Jia et al. | .......................... | 705/59 |
| 6,681,323 B1 * | 1/2004 | Fontanesi et al. | ................. | 713/1 |
| 2002/0022971 A1 | 2/2002 | Tanaka et al. | ..................... | 705/1 |
| 2002/0035693 A1* | 3/2002 | Eyres et al. | .................... | 713/189 |
| 2002/0091645 A1* | 7/2002 | Tohyama | ........................ | 705/59 |
| 2002/0103761 A1* | 8/2002 | Glassco et al. | .................. | 705/59 |
| 2002/0107809 A1* | 8/2002 | Biddle et al. | .................... | 705/59 |
| 2002/0152394 A1 | 10/2002 | Kadoya | ......................... | 713/191 |
| 2003/0156719 A1* | 8/2003 | Cronce | ......................... | 380/256 |

FOREIGN PATENT DOCUMENTS

| | | |
|---|---|---|
| CA | 2157167 | 3/1996 |
| EP | 699995 | 3/1996 |
| JP | 8-77018 | 3/1996 |
| JP | 2000-20316 | 1/2000 |

(Continued)

OTHER PUBLICATIONS

Rosenblatt et. al. "Digital Rights Management Business and Technology" Nov. 2001. All pages. Hungbry Minds, Inc., Indianapolis, IN.*

(Continued)

*Primary Examiner* — Evens J Augustin
*Assistant Examiner* — Calvin K Cheung
(74) *Attorney, Agent, or Firm* — Staas & Halsey LLP

(57) ABSTRACT

A system is provided with which a user of an information processing apparatus is requested to pay only the license charges of the necessary functions of the pre-installed software and an information processing apparatus vendor or the like is also not requested to pay unwanted license fees to the licensors. An information processing apparatus, which has pre-installed at least one software providing a plurality of functions to which each license fee is charged respectively and enables selection of use or no use of the relevant functions, comprises a software storage unit for storing the pre-installed software, a function selection processing unit for executing only the function selected from the stored software, and a network communication unit for transmitting, via the network, the selected function information including the information indicating correspondence between the software name and selected function.

5 Claims, 5 Drawing Sheets

FOREIGN PATENT DOCUMENTS

| | | |
|---|---|---|
| JP | 2000-132291 | 5/2000 |
| JP | 2002-163578 | 6/2002 |
| JP | 2003-5859 | 1/2003 |
| JP | 2003-029861 | 1/2003 |
| JP | 2003-168038 | 6/2003 |
| JP | 2003-228429 | 8/2003 |

OTHER PUBLICATIONS

Japanese Office Action (Notification of Reasons for Rejection) mailed Oct. 20, 2009 in corresponding Japanese Patent Application No. 2004-099265.

* cited by examiner

FIG. 3(a)

SELECT THE FUNCTION TO BE VALIDATED

○ DOCUMENT CREATING FUNCTION   ○ GRAPHIC CREATING FUNCTION   ○ TABLE CREATING FUNCTION

○ LAYOUT DISPLAY SWITCHING FUNCTION   ○ SENTENCE PROOF-READING FUNCTION

[NAME OF PRODUCT USED]

[SERIAL NUMBER OF THE APPARATUS USED]

[NAME]

[MEMBERSHIP NUMBER]

[OK]  [CANCEL]

FIG. 3(b)

YOUR CHECK NUMBER IS:   TAKE THIS NUMBER
[AAAA0000BBBB00]         TO THE NOTE
YOUR LICENSE FEE IS ¥XXXX.
DO YOU WANT TO USE?     [OK]  [CANCEL]

FIG. 3(c)

INPUT THE FUNCTION SELECTION CHECK NUMBER.

OK]  [CANCEL]

FIG. 4

SELECT THE FUNCTION TO BE VALIDATED.

○ WORD-PROCESSOR SOFTWARE

○ DOCUMENT CREATING FUNCTION  ○ GRAPHIC CREATING FUNCTION  ○ TABLE CREATION FUNCTION

○ LAYOUT DISPLAY SWITCHING FUNCTION  ○ SENTENCE PROOF-READING FUNCTION

○ SPREADSHEET SOFTWARE

○ TABLE CREATION FUNCTION  ○ GRAPH CREATING FUNCTION

○ FUNCTION PASTING FUNCTION  ○ AUTO SUM FUNCTION

○ MAIL STORAGE

○ MAIL TRANSMITTING/RECEIVING FUNCTION  ○ MAIL CREATING FUNCTION  ○ MAIL SHARING FUNCTION

○ NEW MAIL CHECK FUNCTION  ○ ACCOUNTING SWITCHING FUNCTION

○ DISPLAY SEQUENCE SWITCHING FUNCTION

[NAME OF PRODUCT USED]

[SERIAL NUMBER OF APPARATUS USED]

[NAME]

[MEMBERSHIP NUMBER]

[OK] [CANCEL]

INFORMATION PROCESSING APPARATUS

CROSS-REFERENCE TO RELATED APPLICATIONS

This application is related to and claims the benefit of priority to Japanese Patent Application No. 2004-99265, filed Mar. 30, 2004, in Japan, the contents of which are incorporated by reference herein.

BACKGROUND OF THE INVENTION

1. Field of the Invention

The present invention relates to a method of adding the software to be used in an information processing apparatus such as Personal computer (or PC).

2. Description of the Related Art

In recent years, information processing apparatus vendors distribute the information processing apparatus to users with pre-installed software.

Moreover, such information processing apparatus vendors are previously producing a plurality of kinds of combinations of software to be pre-installed assuming various users who will use such software under various conditions. Users selectively use the software for operating the information processing apparatus. However, such users do not always use the pre-installed software completely. Accordingly, a problem rises here for users that users must pay the license fees of the software which are pre-installed but are not required.

There exists a prior art in which the information processing apparatus manufacturers are required less manufacturing cost, while users are requested to pay only the cheaper license fees of the necessary software as followings.

Japanese Patent Application Laid-Open No. 2003-228429 discloses an information processing apparatus which is connected to a server via the network and pre-installs a plurality of software pieces in the structure comprising an authentication function for authenticating users of the relevant information processing apparatus when the apparatus is activated or when the apparatus is recovered from the electrical power saving condition, and a license management function for sending the user information obtained by the authentication function to the server via the network, obtaining the license information corresponding to the relevant users from the server, and selectively setting a plurality of software pieces as the executable software pieces in accordance with the license information.

Accordingly, the hardware vendors for manufacturing and supplying client systems are no longer required to prepare for a plurality of pre-installed sets such as the apparatus for business use and domestic use. As a result, the manufacturing cost of the client system can be reduced.

Since the license fee of the software that is not required is no longer charged to users, cost reduction can be realized in the client systems including the software.

However, in JP '429, users are requested to select use or no use of the software in units of the pre-installed software to the information processing apparatus.

Therefore, when the software has a plurality of functions to which the license fees are charged respectively, the license fees of unwanted functions must also be paid. Here, a function means an operation program to form software.

SUMMARY OF THE INVENTION

An aspect of the present invention is to provide a system in which users of the information processing apparatus are requested to pay only the license fees of the required functions of the pre-installed software and the information processing apparatus vendors or the like are also not requested to pay the unnecessary license fees to the licensers.

To achieve the above mentioned aspect, the present invention includes an information processing apparatus pre-installed with software having a plurality of functions to which each license fee is charged and is capable of selecting use or no use of the functions of the software, comprising a software storage unit to store the pre-installed software, a function selection processing unit to enable only the functions selected from the stored software; and a network communication unit to transmit, via a network, selected function information including information which associates the selected functions with the software.

Moreover, in the information processing apparatus of the present invention, the network communication unit transmits information which is required for payment of license fees of said selected functions to a collector of license fees via the network.

Moreover, in the information processing apparatus of the present invention, the function selection processing unit enables functions, not selected in a prior selection and selected in a current selection, and disables functions, selected in a prior selection and not selected in a current selection.

Moreover, the present invention includes a computer-readable medium storing a program which, when executed by an information processing apparatus, causes the information processing apparatus to perform operations comprising transmitting selected function information including information which associates selected functions to software which includes the selected functions, to a vendor of software, receiving function selection check information, from the vendor of software, which is required for enabling the selected function, and executing the selected function as executable functions on the basis of the function selection check information.

Moreover, the present invention includes a function selecting method enabling functions selected from software in an information processing apparatus, as executable functions, comprising transmitting through a network selected function information including information which associates the selected functions to software which includes the selected functions to a vendor of software, receiving function selection check information, from the vendor, which is required for enabling the selected function, executing the selected functions as executable functions on the basis of the function selection check information, and paying license fees corresponding only to the selected functions in the software via a network.

According to the present invention, users are no longer requested to pay the license fees of the unwanted functions because the users are requested to pay the license fees of only the necessary functions of the software which have been pre-installed in the information processing apparatus and can use only the functions of the software for which the license fees have been paid. Accordingly, the users can purchase and use the information processing apparatus in the price cheaper than that of the conventional apparatus.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 3(a), 3(b), and 3(c) are diagrams illustrating dialogs in relation to the present invention.

FIG. 4 is a simultaneous selection dialog in relation to the present invention.

DETAILED DESCRIPTION OF THE PREFERRED EMBODIMENTS

Figure 1:
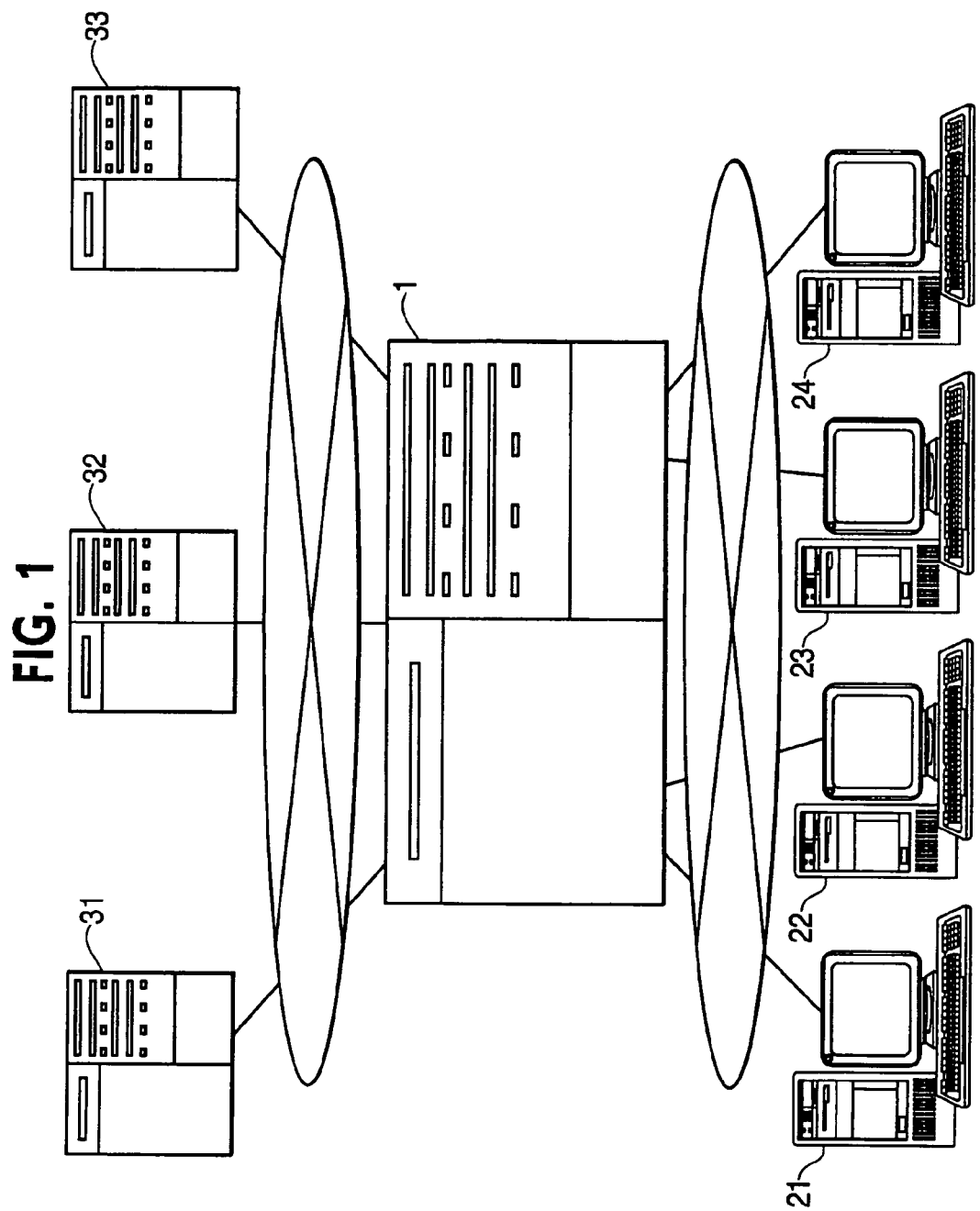
FIG. 1 is a schematic diagram illustrating a profile for embodying the present invention.

Reference will now be made in detail to the embodiments of the present invention, examples of which are illustrated in the accompanying drawings, wherein like reference numerals refer to the like elements throughout. The embodiments are described below in order to explain the present invention by referring to the figures.

FIG. 1 a schematic diagram illustrating a profile for embodying the present invention.

In FIG. 1, a server 1 of the information processing apparatus vendor is connected to information processing apparatuses 21, 22, 23, and 24, and to servers of licensors 31, 32, and 33.

The information processing apparatuses 21, 22, 23, and 24 respectively store a plurality of pre-installed software pieces. Users of respective apparatuses select the software for use and then transmit the function selecting information of the selected software to the server 1 of the information processing apparatus vendor. The server 1 performs management of the license fees for respective functions from the function selecting information transmitted from respective information processing apparatuses and makes payment of the license fees to the servers 31, 32, 33 of the licensors.

Accordingly, users of the information processing apparatuses are requested to pay only the license fees of the functions for use. Therefore, users can utilize the information processing apparatuses in the price cheaper than that of the conventional apparatuses.

Figure 2:
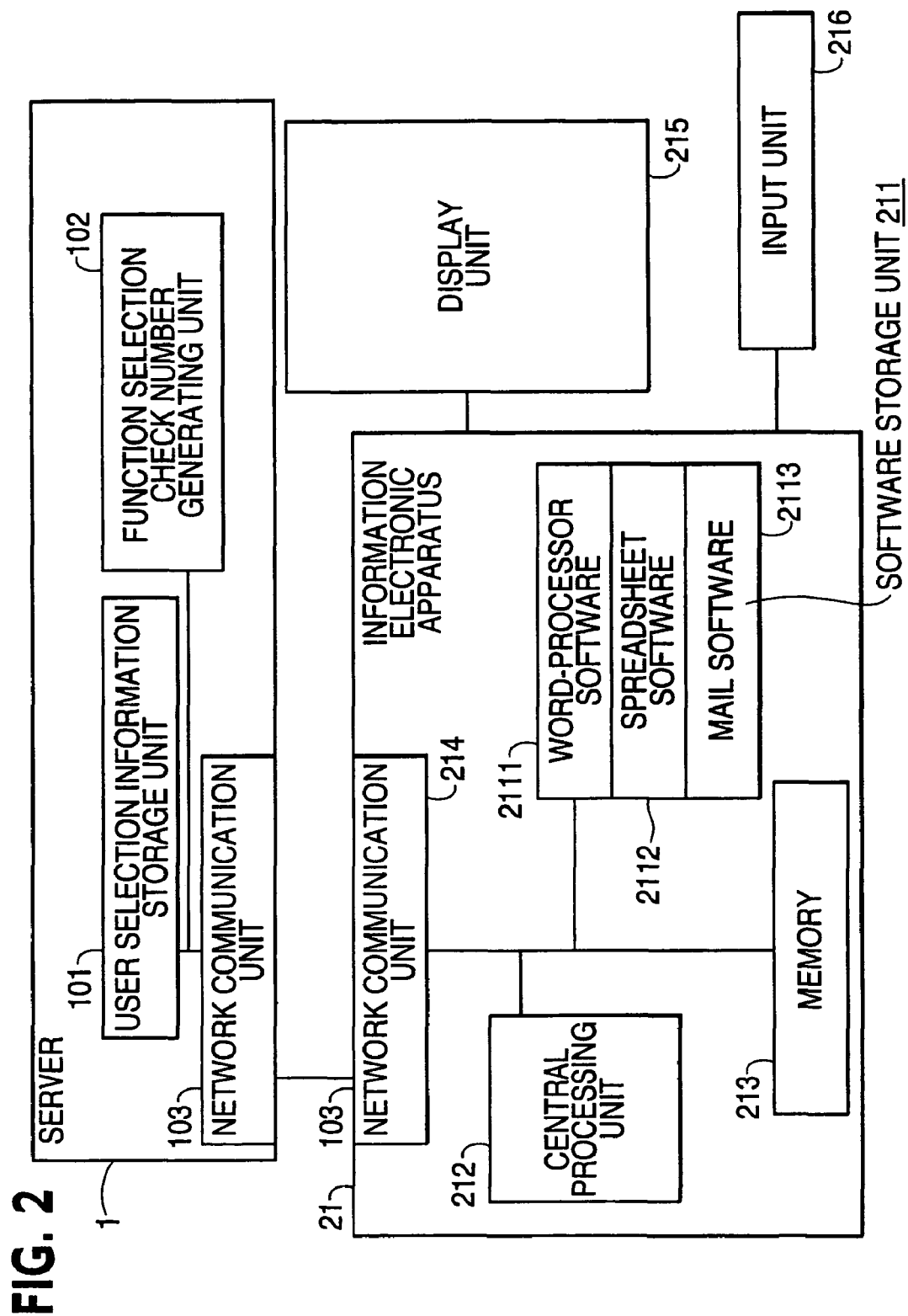
FIG. 2 is a block diagram of an information processing apparatus and a server in relation to the present invention.

FIG. 2 is a block diagram of the information processing apparatus in relation to the present invention.

In FIG. 2, a server 1 of an information processing apparatus vendor is coupled to an information processing apparatus 21.

The server 1 includes a user selection information storage unit 101, a function selection check number generating unit 102, and a network communication unit 103.

The information processing apparatus 21 includes a software storage unit 211, a central processing unit (CPU) 212, a memory 213 and a network communication unit 214 and is respectively connected to a display unit 215 and an input unit 216.

The software storage unit 211 stores a plurality of pre-installed software pieces, for example, a word-processor software 2111, a spreadsheet software 2112, and a mail software 2113.

An information processing apparatus vendor has sold a plurality of conventional information processing apparatuses to which different combinations of software have been installed in accordance with users.

In the case of the present invention, the information processing apparatus vendor does not sell, unlike the conventional vendor, a plurality of kinds of the information processing apparatuses to which different kinds of software pieces are pre-installed but a kind of information processing apparatus to which a plurality of kinds of software pieces are pre-installed to a software storage device in accordance with the requests for use of users.

In the case of the present invention, an information processing apparatus to which the three kinds of software including the word-processor software 2111, spreadsheet software 2112 and mail software 2113 are pre-installed is described as a practical example.

These software pieces cover a variety of functions. The word-processor software includes a document creating function, a graphics creating function, a table creating function, a layout display switching function, and a sentence proofreading function, while the spreadsheet software includes a table creating function, a graph creating function, a functions pasting function, an auto-SUM function, and the mail software includes a mail transmitting/receiving function, a mail creating function, a mail sharing function, a new mail checking function, an account switching function and a display sequence switching function.

When a user activates the word-processor software using an input unit 216, the word-processor software is developed in the memory and a selection dialog is displayed on the display unit 215.

The selection dialog is illustrated in FIG. 3A. The user can select the desired function from the document creating function, graphic creating function, table creating function, layout display switching function and sentence proofreading function.

The user is requested here to input the name and serial number of the information processing apparatus used and also his or her name and membership number.

When the user enters all input items and clicks the key "OK", the information inputted in the selection dialog is transmitted, together with the information showing relationship between the software names and the selected functions, to the server 1 of the information processing apparatus vendor through the network communication units 214, 103.

The server 1 is provided with a user selection information storage unit 101 for management and storage of the user selection information and also a function selection check number generating unit 102 for generating the function selection check numbers to set the functions designated by the users as the executable functions.

The function selection check numbers generated by the function selection check number generating unit 102 are notified and displayed for the user utilizing the dialog of FIG. 3B.

When the user inputs the function selection check number in the dialog of FIG. 3C, the selected function file is decompressed with the central processing unit (CPU) 212 and overwritten for use. Here, the CPU 212 is assumed to execute the process to be executed by the function selection processing unit described in the claims.

In the same manner, when the spreadsheet software and mail software are activated first, the selection dialogs are also displayed and the user can select the desired functions for use.

In the case where these software functions are selected again, the selection dialog is displayed with the selection dialog display function provided to respective software to realize re-selection and update of the desired function.

The user selection information is transmitted again to the server 1 of the information processing apparatus vendor.

When the user selection information before the re-selection is stored in the user selection information storage unit 101 on the basis of the name and serial number of the information processing apparatus and the name of user, the server 1 updates the user selection information to the re-selected user selection information. Moreover, the server 1 generates, in the function selection check number generating unit 102, a new function selection check number and then notifies this new number to the information processing apparatus 21.

When the user inputs the new function selection check number in the dialog of FIG. 3C, the user can use the function which has been re-selected through the overwriting because the function file is depressed again by the central processing unit 212. In this case, since the function deleted by the re-selection is also overwritten, use of this function is disabled.

As described above, the user can easily select again the function selected first and can utilize the information processing apparatus in the cheaper price.

Moreover, the information processing apparatus can realize display for simultaneous selection of functions of a plurality of software pieces.

FIG. 4 illustrates a simultaneous selection dialog for selecting respective functions of the word-processor software, spreadsheet software and mail software.

For the word-processor software, the document creating function, graphics creating function, table creating function, layout display switching function, sentence proof-reading function may be selected, while for the spreadsheet software, the table creating function, graph creating function may be selected, and for the mail software, the mail transmitting/receiving function, mail creating function and mail sharing function may be selected.

The user transmits, to the server, the user selection information which is the information showing relationship between the selected software name and selected function.

The server which has received such user selection information generates a function selection number for the user and then notifies this number to the user using the function selection number generating unit.

When the user inputs the check number in the dialog of FIG. 3C, the selected function is depressed by the central processing unit 212 for use through the overwriting.

In the case, when the software function is to be selected again, the simultaneous selection dialog is displayed on the basis of the simultaneous selection dialog display function of the respective software. Accordingly, the function to be used can be selected again to update the function.

The user selection information is transmitted again to the server 1 of the information processing apparatus vendor.

When the user selection information before the re-selection based on the name and serial number of the information processing apparatus and the name of user exists in the user selection information storage unit 101, the sever 1 updates the user selection information to the re-selected user selection information. Moreover, the server 1 generates, in the function selection check number generating unit 102, the new function selection check number and notifies this number to the information processing apparatus 21.

When the user inputs the new function selection check number in the dialog of FIG. 3C, the function file is depressed again by the central processing unit 212 and the re-selected function be executed through the overwriting. In this case, since the function deleted by the re-selection is also overwritten, this function can no longer be executed.

Accordingly, even when functions of a plurality of software pieces are to be selected, simultaneous management of the user selection information can be realized and the user is also requested to place only one function selection check number under the management.

Figure 5:
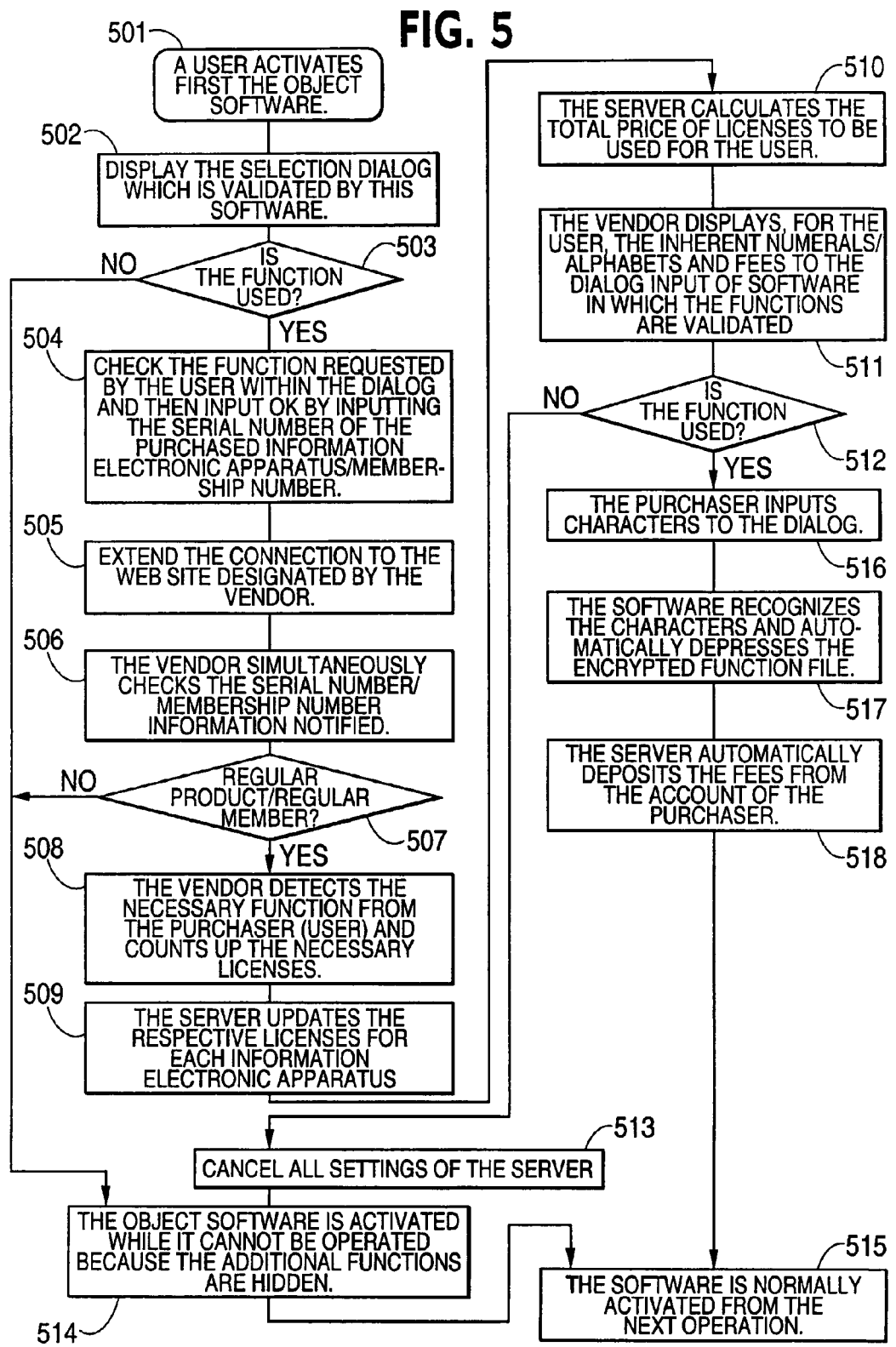
FIG. 5 is a flowchart for selection of function of the software in relation to the present invention.

FIG. 5 illustrates a flowchart in relation to the function selection of software.

The user activates the software to be used (operation 501).

The information processing apparatus 1 displays a selection dialog on the display unit 7 (operation 502).

When the function which the user desires to use exists in the selection dialog, the user checks the function to be used in the selection dialog, then inputs the name and serial number of the information processing apparatus and the name and membership number of user, and clicks the "OK" key (operations 503, 504).

When the function which the user desires to use does not exist in the selection dialog, the user does not select the function in the selection dialog and clicks the "OK" key. Accordingly, the software can be activated while all non-selected functions are hidden (operation 511).

The user selection information is transmitted to the server 1 of the information processing apparatus vendor (operation 505).

When the information processing apparatus is determined as the regular apparatus and the user is determined as the regular member on the basis of the user selection information, the server 1 counts number of the licenses in relation to the desired functions and the server 2 updates the number of licenses in relation to the functions (operations 507, 508, 509).

When the information processing apparatus is not determined as the regular apparatus or the user is not determined as the regular member on the basis of the user selection information, the software is activated while all functions are hidden (operation 514).

The server 1 calculates a sum of the license fees of the information processing apparatus in relation to the user (operation 510).

The server 1 generates the function selection check number for validating the selected function using the function selection check number generating unit 102 and then notifies this number to the user. Moreover, the server 1 also notifies the fees to be paid by the user as the license fees (operation 511).

When the user does not use the selected function, the user cancels the setting of the server in the operations 501 to 509 and then activates the software while all non-selected functions are hidden (operations 513, 514).

When the user utilizes the selected function, the user inputs the notified function selection check number to the displayed dialog (operations 512, 516).

The pre-installed software recognizes each function selection check information, depresses the function file and overwrites the file for use (operation 517).

The server 1 previously stores the account information of the user and deposits the license fees charged for use of the information processing apparatus from the account of the user (operation 518).

Moreover, the server 1 executes detection and management of the license fee information. When the software is to be activated from the next time, the software is activated for use when this software has the selected function.

Accordingly, the function file of the function which the user desires to use is overwritten and is set as the executable function. The information processing apparatus vendor can allow the user to use a plurality of licenses by sending a notification through the display of characters.

Moreover, the license used and the license fee thereof can be detected accurately. Accordingly the fees can be demanded to the purchasers and fees can also be paid to the licensers.

In the related art described in Jp '429, since an image file of the Save to Disk is transmitted and an image of the OS can recovered from such image file, the apparatus can be operated only as the image because a longer download time is required in the network environment of the modem or the like and the image file is transmitted.

Namely, when it is requested to use a word-processor software after an image file of the game software is downloaded, access must be made again to the server by deleting the image file of the game and the image file of the game and word-processor must be newly downloaded. However, according to the present invention, a longer and troublesome download of the software of user can be eliminated.

Next, examples of modifications in the embodiment of the information processing apparatus of the present invention and the other technically extendable items will be listed below.

In the above embodiment, selection of functions of the document creating software, spreadsheet software and mail software are allowed but the present invention is never restricted to such functions.

In the above embodiment, the selection items in the selection dialog are set to the name of product, serial number of the information processing apparatus, user name, and membership number, but the present invention is never limited thereto and the telephone number and addresses or the like as the other user authentication information may also be used.

In the above embodiment, display is performed using visual inputs for the selection of functions but the present invention is never limited thereto and allows, for example, audible inputs.

In the embodiment described above, when the re-selection of functions is requested, whether the user selection information exists or not is determined from the name and serial number of the information processing apparatus and the name of user. However, the present invention is never restricted thereto and determination of existence of the user selection information can also be made from the function selection check number obtained by the user.

In the above embodiment, the function selected on the basis of the function selection check number may be executed but the present invention is not restricted thereto. The selected functions can also be executed on the basis of a function selection check code including the codes other than the number, for example, alphabets or the like.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An information processing apparatus for communicating with a server which controls an operation of software pre-installed in the information processing apparatus, the information processing apparatus comprising:
   a storage unit to store the pre-installed software, the pre-installed software including a plurality of functions operable on the information processing apparatus;
   a controller for detecting a function of the pre-installed software was selected to operate on the information processing apparatus;
   a network communication unit for transmitting, via a network, unique information and select information to the server, the unique information identifying the information processing apparatus, the select information identifying the detected function among the plurality of functions of the pre-installed software, the server managing license fees corresponding to the detected function via the network; and
   a display unit for displaying the license fees of the detected function received from the server after the network communication unit sends the select information to the server;
   wherein the controller receives information for accessing the detected function from the server, using the unique information, when the controller is indicated not to use the detected function in accordance with the received information, the controller does not activate the detected function and does not perform an accounting processing of the license fees corresponding to the detected function to the server, and when the controller is indicated to use the detected function in accordance with the received information, the controller activates the detected function and performs the accounting processing of the license fees corresponding to the detected function to the server.

2. The information processing apparatus according to claim 1, wherein the controller transmits information which is required for payment of license fees of said selected functions to a collector of license fees via network.

3. The information processing apparatus according to claim 1, wherein the controller detects at least one function not detected in a prior detection, and disables one of the functions of the pre-installed software which are not selected to operate on the information processing apparatus.

4. A method for enabling functions of pre-installed software in an information processing apparatus, as the executable functions, the method comprising:
   detecting that a function among a plurality of functions of the pre-installed software was selected to operate on the information processing apparatus;
   transmitting, through a network, unique information and select information to the server, the unique information identifying the information processing apparatus, the select information being indicative of the detected function among the plurality of functions of the pre-installed software, the server managing license fees corresponding to the detected function via the network;
   displaying the license fees of the detected function received from the server after the network communication unit sends the select information to the server;
   receiving information for accessing the function from the server, the information corresponding to the unique information; and
   deactivating the detected function and not performing an accounting processing of the license fees corresponding to the detected function to the server when the controller is indicated not to use the detected function in accordance with the received information, and activating the detected function and performing the accounting processing of the license fees corresponding to the detected function to the server when the controller is indicated to use the detected function in accordance with the received information.

5. A communication system for performing a communication between a server and an information processing apparatus, the server controlling an operation of software pre-installed in the information processing apparatus, the communication system comprising:

the information processing apparatus comprising:
a storage unit to store the pre-installed software, the pre-installed software including a plurality of functions operable on the information processing apparatus,
a first controller for detecting that a function among the plurality of functions of the pre-installed software was selected to operate on the information processing apparatus;
a network communication unit for transmitting, via a network unique information and select information to the server, the unique information identifying the information processing apparatus, the select information indentifying the detected function among the plurality of functions of the pre-installed software, the server managing license fees corresponding to the detected function via the network, and
a display unit for displaying the license fees of the detected function received from the server after the network communication unit sends the select information to the server, and
wherein the controller receives information for accessing the detected function from the server, using the unique information, when the controller is indicated not to use the detected function in accordance with the received information, the controller does not activate the detected function and does not perform an accounting processing of the license fees corresponding to the detected function to the server, and when the controller is indicated to use the detected function in accordance with the received information, the controller activates the detected function and performs the accounting processing of the license fees corresponding to the detected function to the server; and the server includes:
a second controller for controlling an operation of the plurality of functions of the pre-installed software in accordance with a second process, and
wherein the second process includes transmitting the information for accessing the detected function for activating the detected function upon receiving the unique information and the select information, and
the information for said accessing is transmitted to the information processing apparatus.

* * * * *